United States Patent [19]

Schäfer

[11] Patent Number: 5,493,914
[45] Date of Patent: Feb. 27, 1996

[54] DEVICE FOR MEASURING THE FLOW OF A FLUID FLOWING THROUGH A MEASURING PIPE

[75] Inventor: Klaus Schäfer, Hann. Münden, Germany

[73] Assignee: Fischer & Porter GmbH, Goettingen, Germany

[21] Appl. No.: 292,283

[22] Filed: Aug. 18, 1994

[30] Foreign Application Priority Data

Sep. 7, 1993 [DE] Germany ............. 43 30 291.2

[51] Int. Cl.$^6$ ............................................. G01F 1/58
[52] U.S. Cl. ........................... 73/861.16; 73/861.12
[58] Field of Search ........................ 73/861.12, 861.16, 73/861.15

[56] References Cited

U.S. PATENT DOCUMENTS

| | | | |
|---|---|---|---|
| 3,575,051 | 4/1971 | Moore | 73/194 EM |
| 3,802,262 | 4/1974 | Krechmery et al. | 73/861.16 |
| 3,981,190 | 9/1976 | Vidmantas | 73/861.12 |
| 4,470,309 | 9/1984 | Wada | 73/861.12 |
| 4,658,653 | 4/1987 | Tomita | 73/861.12 |
| 4,726,236 | 2/1988 | Wada | 73/861.16 |
| 5,018,391 | 5/1991 | Doll | 73/861.12 |
| 5,301,556 | 12/1992 | Nissen et al. | 73/861.15 |
| 5,375,475 | 12/1994 | Kiene et al. | 73/861.15 |

FOREIGN PATENT DOCUMENTS

| | | |
|---|---|---|
| 547751 | 6/1993 | European Pat. Off. . |
| 9103046 | 7/1991 | Germany . |

Primary Examiner—Richard Chilcot
Assistant Examiner—Jewel V. Artis
Attorney, Agent, or Firm—Foley & Lardner

[57] ABSTRACT

A device for measuring the flow of a fluid flowing through a measuring pipe includes coils arranged above and below the measuring pipe and a pair of electrodes facing each other on the sides of the measuring pipe. The coils are excitable for producing aiding and opposing magnetic fields. A correction circuit corrects the voltage between the electrodes, which is only approximately proportional to the flow of the fluid in the presence of aiding magnetic fields, to an output signal S which is proportionate to the flow of the fluid, by means of a correction function Ug/Ur which depends on the voltages Ur,Ug between the electrodes in the presence of aiding and opposing magnetic fields. Separate correction signals are determined depending on whether the Froude number of the flow in the measuring pipe is greater than or less than one. One of the correction signals is applied to the voltage Ur which corresponds to the aiding magnetic field, for producing an output signal S.

4 Claims, 4 Drawing Sheets

DEVICE FOR MEASURING THE FLOW OF A FLUID FLOWING THROUGH A MEASURING PIPE

BACKGROUND OF THE INVENTION

The present invention relates to a device to measure the flow of a fluid flowing through a measuring pipe, the device includes a coil arranged above the measuring pipe, a coil arranged below the measuring pipe, and a pair of electrodes facing one another, on the side of the measuring pipe, wherein the coils are excitable and produce both aiding and opposing magnetic fields. A correction circuit is provided for correcting the voltage between the electrodes which is only approximately proportionate to the flow of the fluid in the presence of aiding magnetic fields The correction circuit provides a correction function to an output signal proportionate to the flow of the fluid depending on the voltages between the electrodes in the presence of aiding and opposing magnetic fields.

A device of this type is known. It also permits measuring when the measuring pipe is not completely filled.

The fluid flow through the measuring pipe can correspond to a "flowing movement" or to a "rushing movement" (viz. the book by Bohl "Technische Strömungslehre", 9th edition, Section 4.4.3). A flowing movement is characterized by a Froude number Fr which is less than 1, a rushing movement by a Froude number Fr which is greater than 1.

The known device cannot distinguish between a flowing movement and a rushing movement.

The invention starts out from the knowledge that a relation between the voltage corresponding to the aiding magnetic fields and the correction function allows such a distinction. If this relation is utilized, one of two different correction functions can be employed depending on whether the flow is flowing or rushing in order to obtain an output signal which is independent of the state of movement.

SUMMARY OF THE INVENTION

Accordingly, the present device is characterized in that the voltage corresponding to the aiding magnetic fields and the correction function are supplied to a comparator. It is then determined which in whether the relation between this voltage and the correction function corresponds to a flowing movement or a rushing movement of the fluid through the measuring pipe. A signal representative of the correction function is then supplied either a correlator associated with the flowing movement for producing a correction signal representing the flowing movement, or to a correlator associated with the rushing movement for producing a correction signal representing the rushing movement. By supplying by the appropriate correction signal, the voltage corresponding to the aiding magnetic fields is corrected in the resultant output signal.

The device of the present invention operates in a particularly simple fashion and leads reliably to the desired result. That is, the correction function is formed by the quotient from the voltage corresponding to the opposing magnetic fields and the voltage corresponding to the aiding magnetic fields. Then the product of the voltage corresponding to the aiding magnetic fields and the respective correction signal is employed to produce the output signal.

BRIEF DESCRIPTION OF THE DRAWINGS

The invention will be explained below on the basis of an embodiment by referring to the attached drawings.

DETAILED DESCRIPTION OF THE PREFERRED EMBODIMENT

Figure 1:
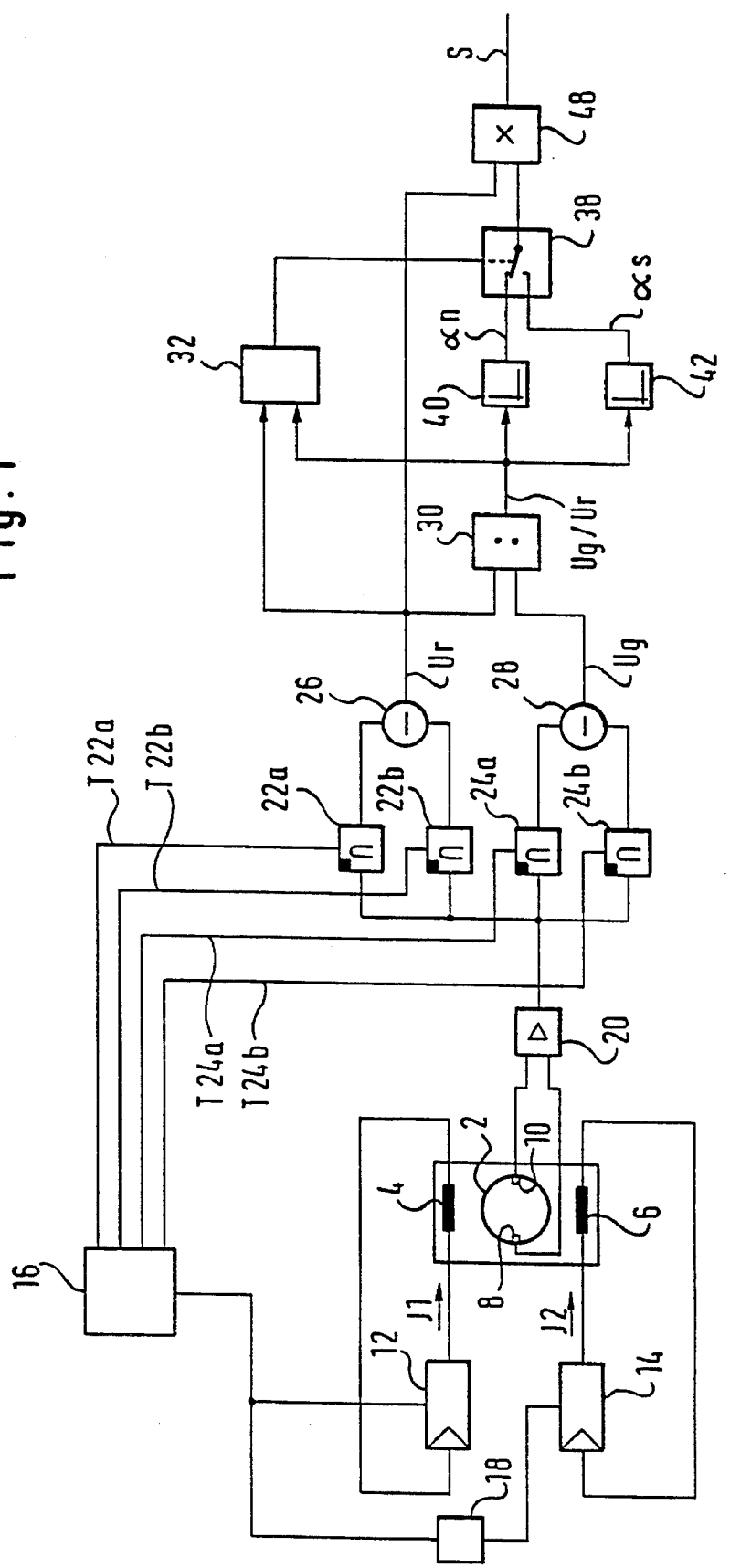
FIG. 1 is a schematic view of a device of the present invention with the corresponding circuit arrangement.
Figure 2:
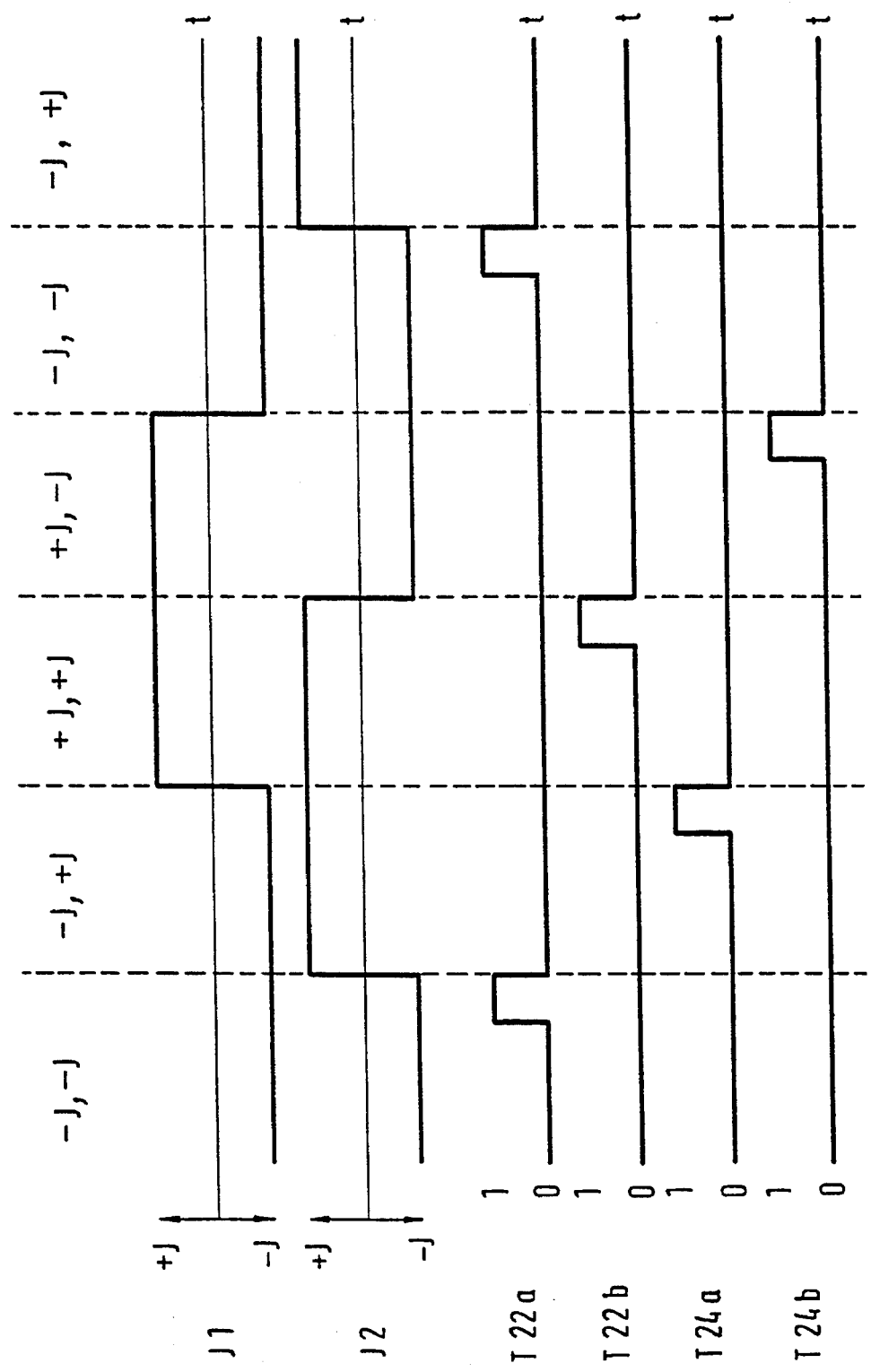
FIG. 2 is a view of the current and signal characteristics for the circuit arrangement of FIG. 1.

FIG. 1 shows a measuring pipe 2 having a coil 4 arranged above and a coil 6 arranged below, as well as a pair of electrodes 8, 10 facing one another. The coils 4, 6 are excitable by drivers 12, 14 which are controlled by a clock generator 16 and produce both aiding and opposing magnetic fields. The drivers 12, 14 are controlled by the clock generator 16 by a phase shifter 18 associated with the driver 14 such that square wave currents phase-shifted 90° are supplied thereto. The voltage generated by the electrodes 8, 10 during this control is received in a differential amplifier 20 whose output signal is supplied to holding members 22a, 22b, 24a, 24b. These holding members 22a, 22b, 24a, 24b are controlled synchronously with the drivers 12, 14 by the clock generator. The coils 4 and 6 are fed by currents whose characteristic with respect to time t can be seen from FIG. 2. The feeding is periodical. Each period has four sections, a section −I/−I in which aiding magnetic fields are produced, a section −I/+I in which opposing magnetic fields are produced, a section +I/+I in which inversely aiding magnetic fields are produced, and a section +I/−I in which inversely opposing magnetic fields are produced. At the end of each section, stationary states of the magnetic fields are produced. Then the voltages generated by the electrodes 8, 10 are received in the holding members 22a, 22b, 24a, 24b by release signals T22a and T22b, T24a and T24b and are stored. The stored signals are erased again at the start of a new period.

Figure 3:
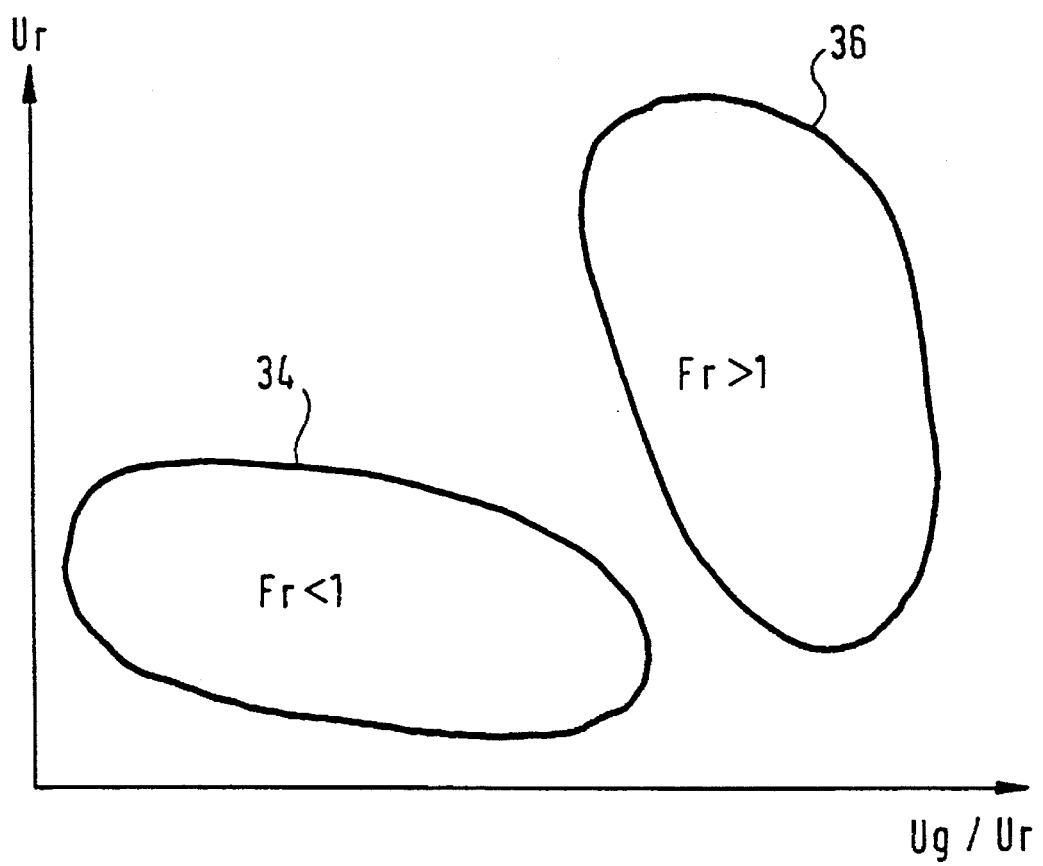
FIG. 3 serves to explain the distinction between a flowing movement and a rushing movement.

The holding members 22a, 22b generate a voltage Ur through a subtraction member 26 which corresponds to the voltage between the electrodes 8, 10 in the presence of magnetic fields in the same direction. The holding members 24a, 24b generate a voltage Ug through a subtraction member 28 which corresponds to the voltage between the electrodes 8, 10 in the presence of magnetic fields in opposing directions. A divider 30 forms a signal from the voltages Ug and Ur representative of Ug/Ur. The voltage Ur and the signal representative of Ug/Ur are received in a comparator which makes a distinction as shown in FIG. 3. Within the region 34, Ur and Ug/Ur are in a relation corresponding to a flowing movement, thus Fr<1, and in the region 36 Ur and Ug/Ur are in a relation corresponding to a rushing movement, thus Fr>1. The comparator 32 sets a multiplexer 38 to a first or a second state depending on which the range 34, 36 that is present.

Figure 4:
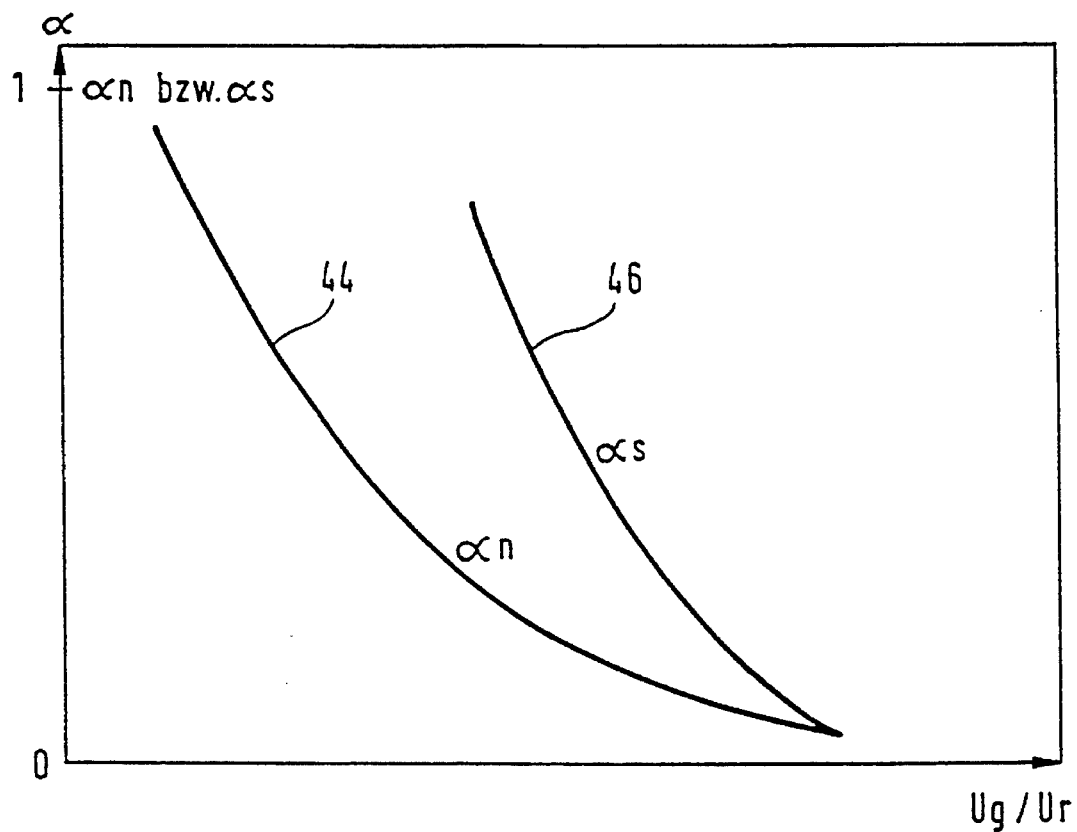
FIG. 4 serves to explain the two

The signal represenative of Ug/Ur, moreover, is supplied to two different correlators tables 40, 42, a first correlator table 40 being assigned to a flowing movement and a second correlator table 42 of being assigned to a rushing movement. The first and second correlators 40, 42 supply corresponding correction factors ∝n and ∝s assigned to the flowing movement and to the rushing movement. FIG. 4 shows the dependency of the correction factors ∝n and ∝s on Ug/Ur. Obviously, the corresponding curves 44 and 46, differ considerably from one another. Ur is multiplied with the respective correction factors ∝n, and ∝s, in a multiplier 48. The result is an output signal S proportionate to the current through the measuring pipe 2 no matter whether the movement is a flowing or a rushing one.

I claim:

1. A device for measuring the flow of a fluid through a measuring pipe, comprising:

a first coil arranged above said measuring pipe, a second coil arranged below said measuring pipe, a pair of electrodes facing each other, on the sides of said measuring pipe;

wherein said first and second coils are excitable and produce both aiding and opposing magnetic fields; and a correction circuit for correcting the voltage between said electrodes which is approximately proportionate to the flow of the fluid in the presence of aiding magnetic fields, said correction circuit being provided to an output signal proportionate to the flow of the fluid by means of a correction function (Ug/Ur) depending on the voltages (Ur, Ug) between the electrodes in the presence of aiding and opposing magnetic fields;

wherein the voltage (Ur) corresponding to the aiding magnetic fields and the correction function (Ug/Ur) are supplied to a comparator which determines whether the relation between the voltage (Ur) and the correction function (Ug/Ur) corresponds to a flowing movement (F<1) or a rushing movement (Fr>1) of the fluid through the measuring pipe, said comparator in response thereto supplying a signal representative of the correction function (Ug/Ur) to a first correlator associated with the flowing movement (having a Froude number (Fr)<1) for producing a correction signal ($\propto$n) representing the flowing movement, or to a second correlator associated with the rushing movement (having a Froude number (Fr)>1) for producing a correction signal ($\propto$s) representing the rushing movement, and by selection of an appropriate correction signal ($\propto$n), or ($\propto$s), the voltage (Ur) corresponding to the aiding magnetic fields is corrected, thereby producing a corrected output signal.

2. The device as set forth in claim 1 wherein the correction function (Ug/Ur) is formed by the quotient from the voltage (Ug) corresponding to the opposing magnetic fields and the voltage (Ur) corresponding to the aiding magnetic fields, and that the output signal represents the product from the voltage (Ur) corresponding to the aiding magnetic field and the respective correction signal ($\propto$n, $\propto$s).

3. A device of claim 2, wherein the first and second coils are characterized by periodical feeding in four sections, a first section in which the aiding magnetic fields are produced, a second section in which the opposing magnetic fields are produced, a third section in which inversely aiding magnetic fields are produced, and a fourth section in which inversely opposing magnetic fields are produced.

4. A device of claim 3, wherein said device further includes a multiplexer, said multiplexer processing data received from said comparator and transferring said processed data to either said first correlator or said second correlator.

\* \* \* \* \*